US008875007B2

(12) United States Patent
Yang et al.

(10) Patent No.: US 8,875,007 B2
(45) Date of Patent: Oct. 28, 2014

(54) CREATING AND MODIFYING AN IMAGE WIKI PAGE

(75) Inventors: Linjun Yang, Beijing (CN); Qi Tian, Helotes, TX (US)

(73) Assignee: Microsoft Corporation, Redmond, WA (US)

(*) Notice: Subject to any disclaimer, the term of this patent is extended or adjusted under 35 U.S.C. 154(b) by 432 days.

(21) Appl. No.: 12/941,739

(22) Filed: Nov. 8, 2010

(65) Prior Publication Data

US 2012/0117449 A1 May 10, 2012

(51) Int. Cl.
*G06F 17/22* (2006.01)
*G06F 17/30* (2006.01)

(52) U.S. Cl.
CPC ...... *G06F 17/30277* (2013.01); *G06F 17/3028* (2013.01); *G06F 17/30893* (2013.01)
USPC ........... 715/201; 715/234; 715/241; 707/723; 707/769

(58) Field of Classification Search
USPC ......... 715/200, 201, 202, 203, 204, 205, 207, 715/209, 210, 226, 231, 234, 256, 273, 700, 715/760; 707/602, 706, 723, 769, 772, 913, 707/915, 917
See application file for complete search history.

(56) References Cited

U.S. PATENT DOCUMENTS

| | | | |
|---|---|---|---|
| 7,043,474 B2 | 5/2006 | Mojsilovic et al. | |
| 7,076,498 B2 | 7/2006 | Banerjee et al. | |
| 7,111,002 B2 * | 9/2006 | Zhang et al. | 1/1 |
| 7,113,921 B2 | 9/2006 | Linker et al. | |
| 7,146,382 B2 | 12/2006 | Yamamoto | |
| 7,457,825 B2 * | 11/2008 | Li et al. | 1/1 |
| 7,529,732 B2 * | 5/2009 | Liu et al. | 1/1 |
| 7,657,126 B2 | 2/2010 | Gokturk et al. | |
| 7,657,507 B2 | 2/2010 | Shi et al. | |
| 7,689,615 B2 * | 3/2010 | Burges et al. | 707/723 |
| 7,895,196 B2 * | 2/2011 | Mahadevan et al. | 707/728 |
| 8,081,824 B2 * | 12/2011 | Li et al. | 382/190 |
| 8,364,698 B2 * | 1/2013 | Delgo et al. | 707/769 |
| 8,406,573 B2 * | 3/2013 | Wang et al. | 382/305 |
| 8,452,794 B2 * | 5/2013 | Yang et al. | 707/767 |
| 2002/0025085 A1 * | 2/2002 | Gustafson et al. | 382/311 |
| 2003/0187844 A1 * | 10/2003 | Li et al. | 707/7 |
| 2005/0071328 A1 * | 3/2005 | Lawrence | 707/3 |

(Continued)

OTHER PUBLICATIONS

Chang, et al., "Visual Information Retrieval from Large Distributed On-line Repositories", retrieved on Jul. 7, 2010 at <<http://www.ctr.columbia.edu/papers_advent/97/CACMdec97_ana.pdf>>, Communications of the ACM, vol. 40, No. 12, 1997, pp. 63-71.

(Continued)

*Primary Examiner* — Maikhanh Nguyen
(74) *Attorney, Agent, or Firm* — Carole Boelitz; Micky Minhas; Lee & Hayes PLLC (57) ABSTRACT

An ImageWiki architecture is used to generate an image-based web page for an image on the Web. An ImageWiki page may be created automatically or individually, by a user of the Web. Additionally, a user may revise existing ImageWiki pages to update a particular page or correct an incorrect or misleading previous entry. The ImageWiki application indexes images located on the Web. Once the images are indexed, the information related to the images is mined and extracted from various sources of web data. Finally, an ImageWiki page or web page is generated for each image. The resulting ImageWiki page contains the image as well as the aggregated information relating to the image.

20 Claims, 7 Drawing Sheets

(56) References Cited

U.S. PATENT DOCUMENTS

| | | | |
|---|---|---|---|
| 2006/0149734 A1* | 7/2006 | Egnor et al. | 707/7 |
| 2007/0033170 A1* | 2/2007 | Sull et al. | 707/3 |
| 2007/0061301 A1* | 3/2007 | Ramer et al. | 707/3 |
| 2007/0067345 A1* | 3/2007 | Li et al. | 707/104.1 |
| 2007/0218900 A1* | 9/2007 | Abhyanker | 455/435.1 |
| 2007/0237426 A1* | 10/2007 | Xie et al. | 382/305 |
| 2008/0172357 A1* | 7/2008 | Rechis et al. | 707/2 |
| 2008/0172362 A1* | 7/2008 | Shacham et al. | 707/3 |
| 2008/0172374 A1* | 7/2008 | Wolosin et al. | 707/5 |
| 2009/0041366 A1* | 2/2009 | Li et al. | 382/250 |
| 2009/0055742 A1 | 2/2009 | Nordhagen | |
| 2009/0138906 A1 | 5/2009 | Eide et al. | |
| 2009/0161962 A1* | 6/2009 | Gallagher et al. | 382/203 |
| 2009/0216758 A1* | 8/2009 | Tuttle et al. | 707/5 |
| 2009/0313239 A1* | 12/2009 | Wen et al. | 707/5 |
| 2010/0070523 A1* | 3/2010 | Delgo et al. | 707/769 |
| 2010/0166339 A1* | 7/2010 | Gokturk et al. | 382/305 |
| 2010/0306249 A1* | 12/2010 | Hill et al. | 707/769 |
| 2011/0064310 A1* | 3/2011 | Ohk | 382/176 |
| 2011/0106782 A1* | 5/2011 | Ke et al. | 707/706 |

OTHER PUBLICATIONS

Goodrum, et al., "Image searching on the Excite Web search engine", retrieved on Jul. 7, 2010 at <<http://sky.scitech.qut.edu.au/~spinkah/eprints/IPM-Image.pdf>>, Elsevier Science Publishers, Information Processing and Management, vol. 37, 2001, pp. 295-311.

Nister, et al., "Scalable Recognition with a Vocabulary Tree", retrieved on Jul. 7, 2010 at <<http://citeseerx.ist.psu.edu/viewdoc/download?doi=10.1.1.61.9520&rep=repl&type=pdf>>, IEEE Computer Society, Proceedings of Conference on Computer Vision and Pattern Recognition (CVPR), vol. 2, 2006, pp. 2161-2168.

* cited by examiner

404
John F. Kennedy
35th President of the United States
January 20, 1961 – November 22, 1963

File Info
Title: President John F. Kennedy in Ireland.
Date: 27 June 1963(1963-06-27)
Source:
http://www.jfklibrary.org/Asset+Tree/Asset+Viewers/Image+Asset+Viewer.htm?guid={CAEE4142-4C58-4CC1-A33C-23CB9C57F877}&type=Image
http://www.jfk.org/ireland/1.jpg
Author: Robert Knudsen, White House
Near duplicates:

Story in the Image
On the occasion of his visit to the Republic of Ireland in 1963, President Kennedy joined with Irish President Éamon de Valera to form The American Irish Foundation. The mission of this organization was to foster connections between Americans of Irish descent and the country of their ancestry. Kennedy furthered these connections of cultural solidarity by accepting a grant of armorial bearings from the Chief Herald of Ireland. Kennedy had near-legendary status in Ireland, due to his ancestral ties to the country. Irish citizens who were alive in 1963 often have very strong memories of Kennedy's momentous visit.[37] He also visited the original cottage at Dunganstown, near New Ross, where previous Kennedys had lived before emigrating to America, and said: "This is where it all began ..." On December 22, 2006, the Irish Department of Justice released declassified police documents that indicated that Kennedy was the subject of three death threats during this visit. Though these threats were determined to be hoaxes, security was heightened.[38]

Related Images

Related Videos

Related News
The JFK museum in Boston has opened up
Obama elected 44th President

Related Wiki Entries
John F. Kennedy   America   USA   President

CREATING AND MODIFYING AN IMAGE WIKI PAGE

BACKGROUND

Wikipedia pages have become very popular as a means to search for terms and obtain information about those terms. Wikipedia pages work well for textual queries. However, there is an increasingly large amount of image data available on the Web and there is currently no efficient method for searching the images and obtaining information about those images.

SUMMARY

An ImageWiki application is created to generate an image based web page for individual images available on the Web. ImageWiki pages may be created automatically or individually, by a user of the Web. Additionally, a user may revise existing ImageWiki pages to update a particular page or correct an incorrect or misleading previous entry. The ImageWiki application has the capability to index images located on the Web. Once the images are indexed, the information related to each of the images is mined and extracted from various sources of web data. Finally, an ImageWiki page or web page is generated for each image. For each image, the resulting web page contains the image as well as aggregated information relating to the image. The information typically includes a caption, file information such as title, date, source and author, a story describing the meaning behind the image, related images, related videos, related news events and related Wiki entries.

Consequently, the resulting ImageWiki web page provides a readable, understandable summary of the image that is searchable by the general web population.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

Overview

ImageWiki is a knowledge-based architecture with images as entries. Presumably all images available could be indexed and the related information mined and aggregated to provide users with knowledge of what is contained in the images and the information behind the images. The architecture also allows users to search for better quality images and/or different aspects of the image.

The foregoing explanation provides a brief overview of the ImageWiki architecture, however, a more detailed description follows. An illustrative architecture is described followed by a description of an illustrative process.

Illustrative Architecture

Figure 1:
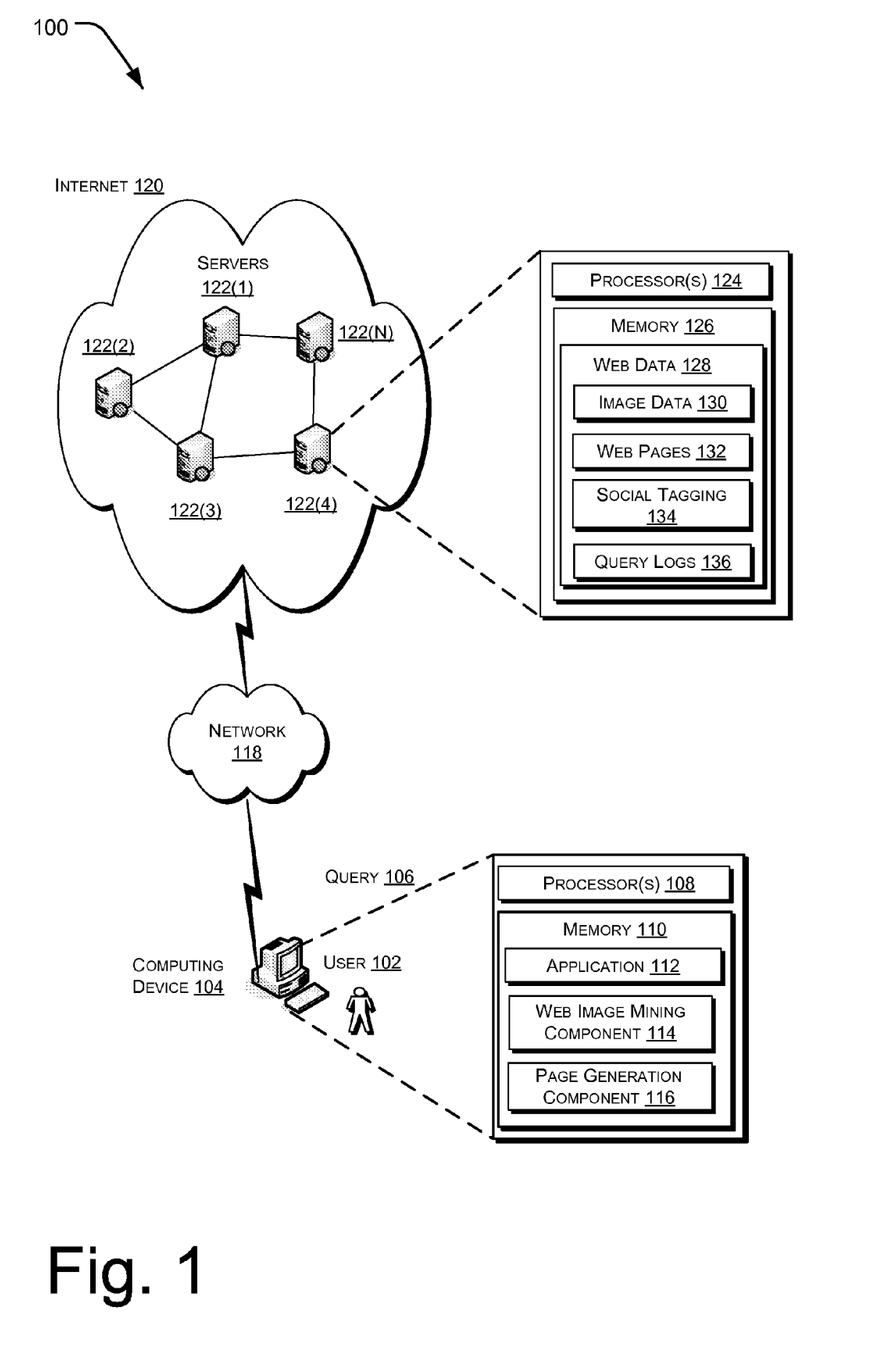
FIG. 1 is a block diagram that illustrates an example ImageWiki architecture.

FIG. 1 illustrates an ImageWiki architecture 100. ImageWiki architecture 100 includes a user 102 that provides input to computing device 104. The input may be in the form of a query 106 to search for images on the Web. In many portions of this document, a query is referenced. While the query may be a textual query, the query may also include selecting a region of an object or image and in fact, the query is really a query region. The terms query and query region are used interchangeably in this document.

Computing device 104 includes one or more processors 108, memory 110 and applications 112. The applications may include an ImageWiki application, a query by example application or an image pagerank application. The computing device 104 further includes a web image mining component 114 and a page generation component 116. The web image mining component 114 and the page generation component 116 may be separate from the application 112 or may be a part of the application 112. The web image mining component 114 identifies, retrieves and extracts data from various sources related to images identified from the input by user 102. The data provides information relating to the images such as title, author, date and source. The data further provides such items as a story behind an image, a caption that briefly identifies the context of an image, other related images, related videos, related news events and other related wiki entries. Details regarding the data and format are described more fully with reference to FIG. 4, below. The page generation component 116 aggregates the data and combines the aggregated data with the image to create an ImageWiki page that may be posted on the Web for discovery by other users.

Computing device 104 is connected to the Internet 120. Typically, the computing device 104 is connected to the Internet via network 118. Internet 120 includes servers 122(1) . . . 122(N). Each server 122 contains one or more processors 124, memory 126 and web data 128. Web data 128 includes, for example, image data 130, web pages 132, social tagging 134 and query logs 136. Information from the image data 130, web pages 132, social tagging 134 and query logs 136 is mined using application 112 located at computing device 104 to extract information related to a particular image that results from a query 106 by user 102. The application 112 may also be located on one or more of the Internet servers 120.

As described above, the ImageWiki architecture 100 is implemented within a computing system environment. For instance, the components of a particular computing system within the environment can include, but are not limited to, one or more processors (e.g., any of microprocessors, controllers, and the like), a system memory, and a system bus that couples the various system components. The one or more processors process various computer executable instructions to control the operation of the computing system and to communicate with other electronic and computing devices. The system bus represents any number of several types of bus structures, including a memory bus or memory controller, a peripheral bus, an accelerated graphics port, and a processor or local bus using any of a variety of bus architectures.

The computing system may be implemented using any form of computer-readable media. Computer-readable media may include, for example, computer storage media and communications media. Computer storage media is configured to store data on a physical memory storage device, while communications media is not.

Computer storage media includes volatile and non-volatile, removable and non-removable media implemented in any method or technology for storage of information, such as computer readable instructions, data structures, program modules, or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other memory medium that can be used to store information for access by a computing device.

In contrast, communication media may embody computer readable instructions, data structures, program modules, or other data in a modulated data signal, such as a carrier wave, or other transport mechanism.

Figure 2:
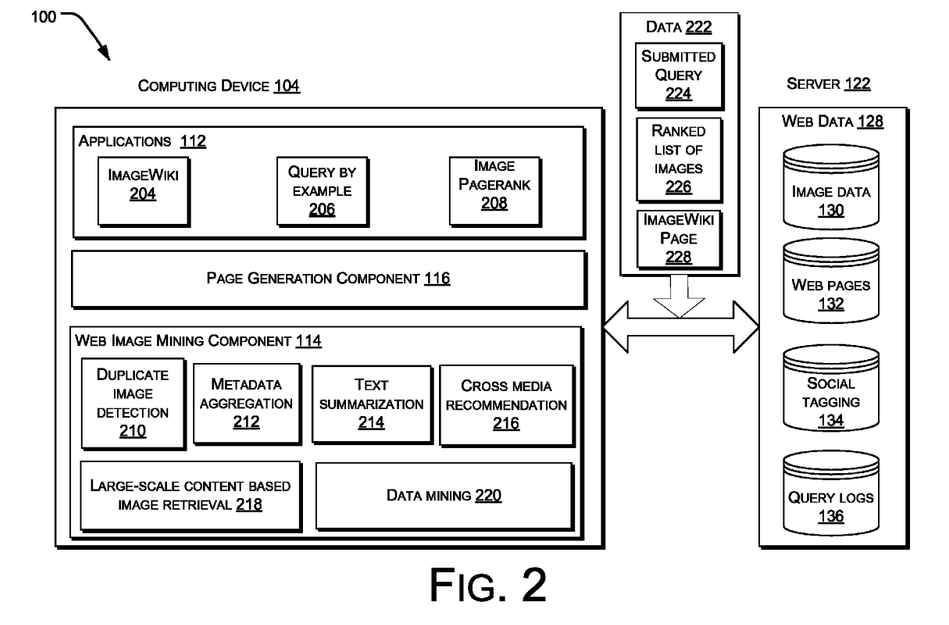
FIG. 2 is a block diagram that illustrates examples of elements of the ImageWiki architecture.

FIG. 2 shows example elements of the ImageWiki architecture 100. The computing device 104 includes applications 110, page generation component 114 and web image mining component 112. The applications 110 may contain, in addition to the ImageWiki application 204, such applications as query by example 206 and image pagerank 208. These applications may provide additional methods of searching in addition to the wiki type pages. The architecture 100 includes the page generation component 116 which may be part of the application 112 or separate from the application 112 and generates a wiki page for each image. The page generation component 116 operates automatically such that it finds and indexes the images, mines the data, aggregates the data and generates an ImageWiki page. However, the architecture also allows the user to create an entirely new ImageWiki page as part of the page generation component 116 and/or allows the user to modify, revise and/or append data to an existing ImageWiki page. For instance, a user may notice that some of the information in an existing ImageWiki page is outdated, incorrect or misleading and may want to delete, add to or revise the existing information. Likewise, a user may discover an image that has not yet been indexed and for which an ImageWiki page does not yet exist. In that case, the user may want to create a new ImageWiki page for that image.

The web image mining component 114 may also be part of the application 112 or may be separate from the application 112 and includes duplicate image detection module 210, metadata aggregation module 212, text summarization module 214 and cross media recommendation module 216. Duplicate image detection module 210 provides a means to identify duplicate images. In the case of duplicate images, the user may want to select the image with the best quality or a different perspective or the like. In such a case, the duplicate image detection module 210 allows the user to quickly look through the duplicate images and select an optimal image.

The metadata aggregation module 212 takes the information gathered in the page generation component 116, typically in the form of metadata, and aggregates the information in preparation for creating a new ImageWiki page or revising an existing ImageWiki page. Text summarization module 214 gathers the textual information related to the image and summarizes that information. For instance, an entire article may be associated with a particular image. This is too much information in many cases to include in the ImageWiki page. Consequently, the text summarization module 214 retains the most relevant descriptive information relating to the image and discards the remainder of the information in the article or other text associated with the image.

Cross media recommendation module 216 is used when images such as still images and video are identified that both have textual representations or information associated with them. The various media, such as images and video, are converted to a textual representation. A recommendation list is generated that provides a recommendation for determining which of the textual representations is optimal. The textual representation from the optimal recommendation may then be used when the data is aggregated.

Figure 4:
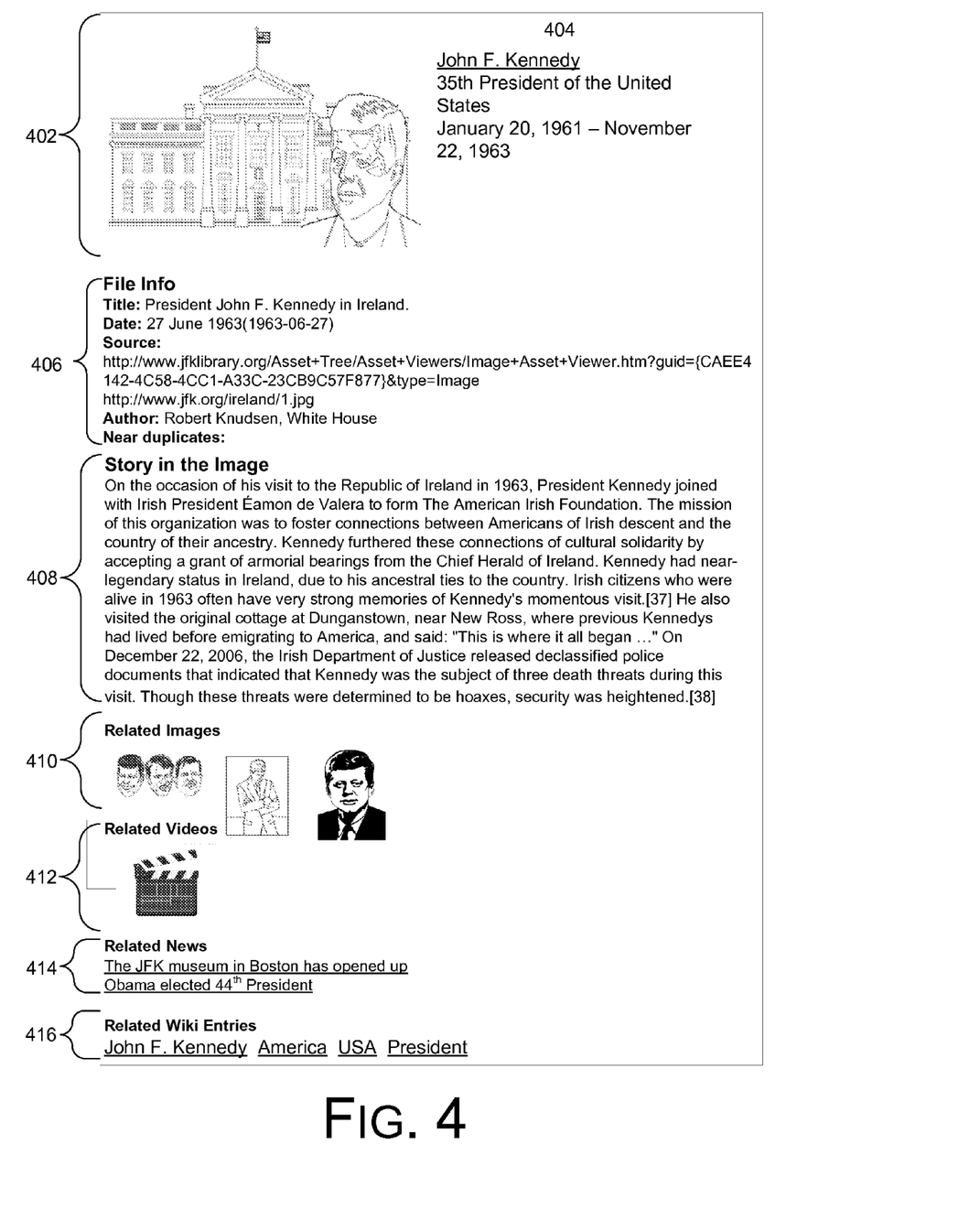
FIG. 4 is a display format of an example ImageWiki page.

The web image mining component 114 further includes two types of image mining and retrieval modules. The large-scale content based image retrieval module 218 retrieves large numbers of images from a variety of sources on the Internet. Data mining module 220 identifies and extracts data relevant to a particular image. The data that is extracted includes information relating to the image such as title, author, date and source. The data that is extracted further provides such items as a story behind the image, a caption that briefly identifies the context of the image, other related images, related videos, related news events and other related wiki entries. FIG. 4 is described below and shows an example of the types of information that are mined by data mining module 220.

As described above, data is mined from Internet sources. The web data 128 includes, for example, image data 130, web pages 132, social tagging 134 and query logs 136. Image data 130 includes the images themselves. The images may be stored on the Internet, e.g., in one or more of the Internet servers 120 in FIG. 1. Image data 130 may include pointers to the images located on the Internet. Web pages 132 are any pages that exist on the Internet. The Web pages themselves are stored on the Internet and Web pages 132 include the URLs to the Web pages stored on the Internet. These pages may be from any web site and include such items as Google® pages, private web site pages, etc. Social tagging 134 refers to the stored tags that are created and managed to annotate and categorize content. These tags provide information relating to a variety of items, and specifically, in this case, to images. Query logs 136 provide a history of queries and point to information associated with particular queries. Again, in this case, images are of particular interest. The query may be text based and related to an image or the query may involve selecting a region of an image as the query. Queries associated with or that have identified images embedded in the results are of importance in the data mining operations.

A large-scale content based image retrieval module 218 retrieves images related to a particular query on a large scale. For example, a user supplies a query object by selecting a region of a query image. In many portions of this document, a query is referenced. Since the query is submitted by selecting a region of an object or image, the query is really a query region. The terms query and query region are used interchangeably in this document. The large-scale image retrieval module returns a ranked list of images that contain the same object, retrieved from a large corpus such as the web data 128. For example, data 222 is exchanged between the computing device 104 and the server 122. Data 222 includes a submitted query 224, a ranked list of images 226 and an ImageWiki page 228. The submitted query 224 is generated at the computing device 104 and sent to the server 122. A ranked list of images 226 is generated at the server 122 and sent to the computing device 104 where an ImageWiki page 228 is generated and sent to the server 122 for storage. In this context, web data 128 is discussed, although another large corpus, such as a large database not located on the web may be contemplated.

One means of conducting large scale content based image retrieval is to use a bag of words model in conjunction with a spatial re-ranking model. The bag of words model initially filters the returned results in order to reduce the number of images that need to be considered from the query. Unlike a typical bag of words model, this model uses visual words where images are scanned for salient regions and a high-dimensional descriptor is computed for each region. The descriptors are then quantized or clustered into a vocabulary of visual words, and each salient region is mapped to the visual word closest to it under this clustering. An image is then represented as a bag of visual words, and these are entered into an index for later querying and retrieval. Methods, such as approximate k-means (AKM) or hierarchical k-means (HKM) may be used to cluster the descriptors into a vocabulary of visual words.

For computational speed, the page generation component 114 stores word occurrences in an index, which maps individual words to the documents in which they occur.

Figure 3:
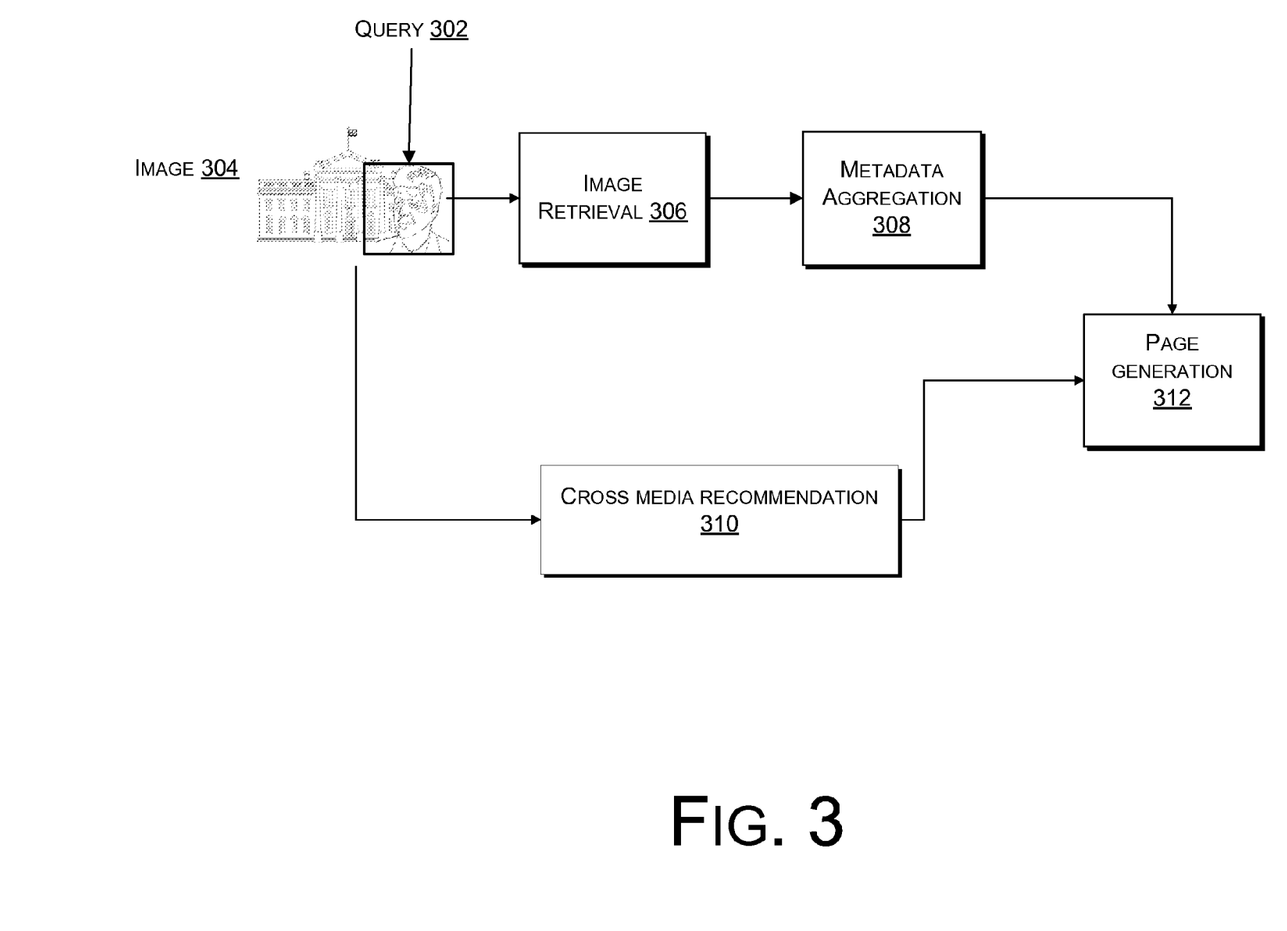
FIG. 3 is a block diagram of an illustrative process for implementing an example ImageWiki architecture.

FIG. 3 illustrates an embodiment of an implementation of the ImageWiki architecture. A query 302 may be generated by selecting a region of an image 304. During image retrieval 306 the web data is searched and images as well as related information is retrieved from throughout the Internet. Image retrieval 306 also indexes the images in order of those most relevant to the query. Once the images and related information are retrieved and indexed, metadata aggregation 308 represents a step in the process that aggregates the information. In the aggregation of the information, duplicate and irrelevant information is removed and the most pertinent information is retained.

Concurrently with the image retrieval 306 and the metadata aggregation 308, a cross media recommendation 310 is conducted. The cross media recommendation 310 looks at other types of media such as video. Typically, different media have a textual representation based on the surrounding text or tags. Once this textual representation is retrieved, recommendations may be generated for the most relevant cross media to include in the wiki page. The recommendations may be presented to the user for selection or may be generated automatically and ranked with the optimal recommendation being used as the cross media recommendation 310.

Page generation 312 combines information from the metadata aggregation 308 and from the cross media recommendation 310 to generate an ImageWiki page containing the image and a presentation of the aggregated information that provides information about the image. FIG. 4 is an example of an ImageWiki page generated by page generation 312.

FIG. 4 displays an image 402 and a caption 404. The caption 404 provides brief information providing context to the image 402. For instance, in this case, the caption reads "John F. Kennedy, 35$^{th}$ President of the United States, Jan. 20, 1961-Nov. 22, 1963". This tells the reader of the ImageWiki page the subject of the image to which this particular ImageWiki page is addressed. In some images, there may be several different subjects or topics contained within the image. The caption identifies the subject resulting from the selection of the query region. Web data is shown in the remainder of the page. As described earlier, web data is retrieved from many different sources on the Internet and is aggregated to summarize and reduce the amount of information gathered. In this example, the web data includes file information 406, textual story 408, related images 410, related videos 412, related news events 414 and related web pages 416.

File information 406 includes pertinent information related to the image 402 such as title, date, source, author and if applicable, near duplicates of the image 402. This is key information related to the image 402 that allows a reader of the page to verify the image and/or provides additional subject matter that may allow the reader to create additional searches related to the image.

Textual story 408 is a summarized text about the image that provides additional information that helps to provide insight about what is behind the image in terms of context, history and useful information about the event, person, or location, etc.

Related images 410 are images that are related to the image but are not duplicates. They may show different views of the subject of image 402 or possibly different images related to image 402. For instance, in the present case, the image 402 shows President Kennedy outside in a car. Other images may show President Kennedy at the White House or meeting with dignitaries, etc.

Related videos 412 are videos related to the image. In this instance, videos may include President Kennedy giving a speech, etc.

Related news events 414 include news events that are related and of interest to someone interested in image 402. For instance, in the present example, the related news event is "The JFK museum in Boston has opened up" and "Obama elected 44$^{th}$ President". The events are presented as hyperlinks so a user may click on the news event and go directly to that story. From this example, it can be seen that the related news events do not have to be directly about President Kennedy. In this example, one of the news events is about the current President since both images relate to a President. The related news events could also have pointed to an item related to former President Bush.

Related web pages 416 are typically additional related wiki entries for key words related to the image 402. In this example, the related wiki entries are "John F. Kennedy", "America", "USA", and "President".

All of these different segments of the ImageWiki page provide a concise summary of the information relating to the image.

Illustrative Process

Figure 5:
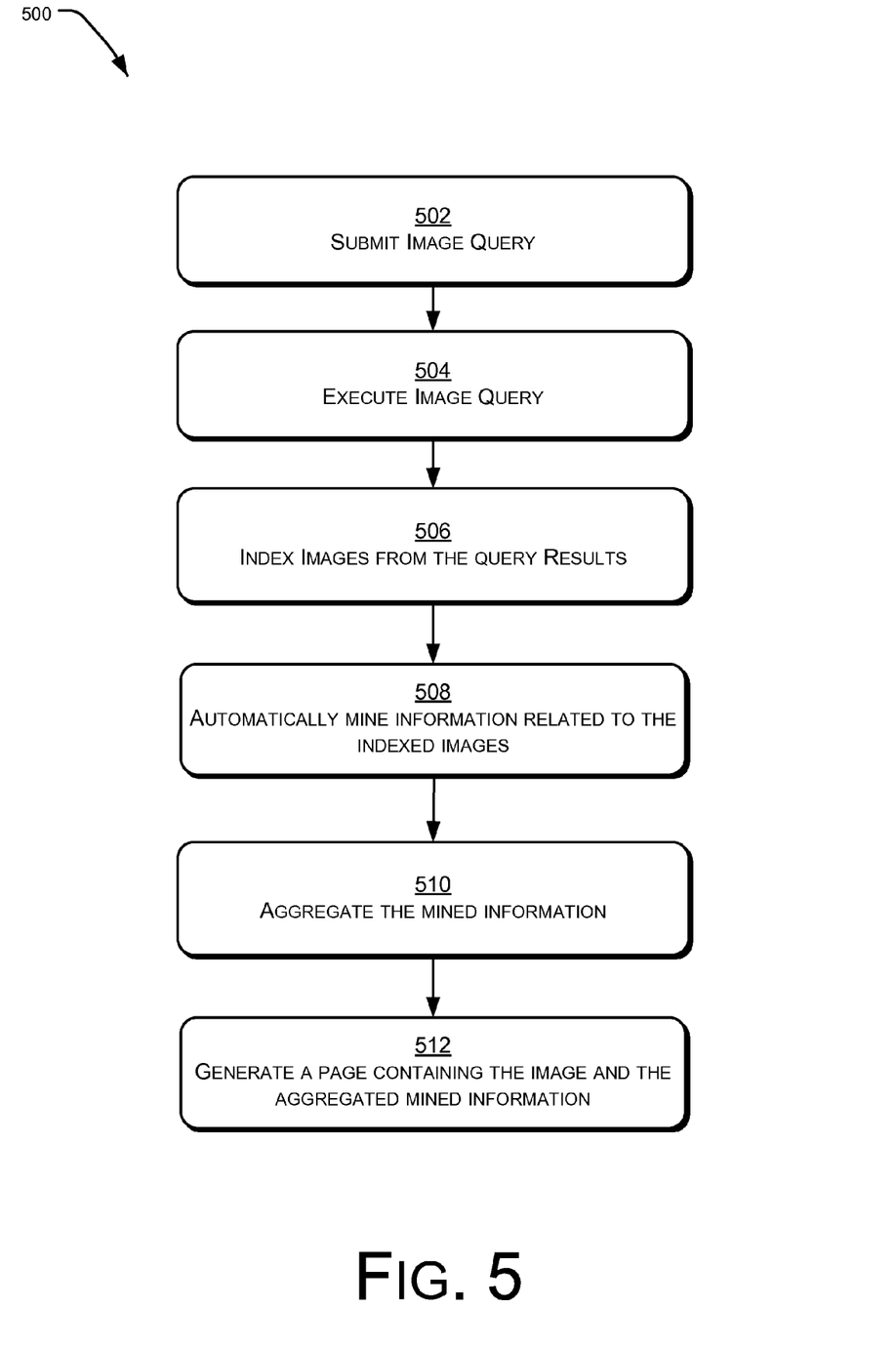
FIG. 5 is a flow diagram of an illustrative process for implementing an automatic ImageWiki architecture.

FIG. 5 is a flow diagram of an illustrative process 500 for implementing an automatic ImageWiki architecture. In operation 502, an image query is submitted. The image query may be automatically generated by the ImageWiki application in the case of an automated query or input by a user. For example, a user may select a particular image, or a specific region of a particular image, and that selected image or image region is used as a query. The image query is executed in operation 504 and image results are obtained.

In operation 506, the page generation component indexes the image results from the query. The indexing ranks the image results generated from the query in order of relevance to the query. The web image mining component automatically mines information from the most relevant images to retrieve and extract information relevant to the image or images in operation 508. The data relating to the image may be in the form of text, metadata or tags.

The web image mining component aggregates the mined information in operation 510 in the metadata aggregation module. The aggregation of the information includes selecting the most relevant information from all of the mined information and summarizing it to reduce the volume of information collected and yet make it of high quality in relation to relevance to the image. Various ranking methods may be used to determine the most relevant information. For example, the majority voting method may be used, which looks at the number of times certain data is identified in relation to a given image. The greater number of times the data is present in relation to a given image, the more relevant the data.

In operation 512, a page is generated in the page generation component that contains the image and the aggregated mined information in a presentable, easy to understand and pleasing way to users of the web that view the generated page. For example, a template may be used to present the information in a given format such as that shown in FIG. 4. Other presentations may be contemplated and used as needs and additional aesthetic considerations are considered.

Figure 6:
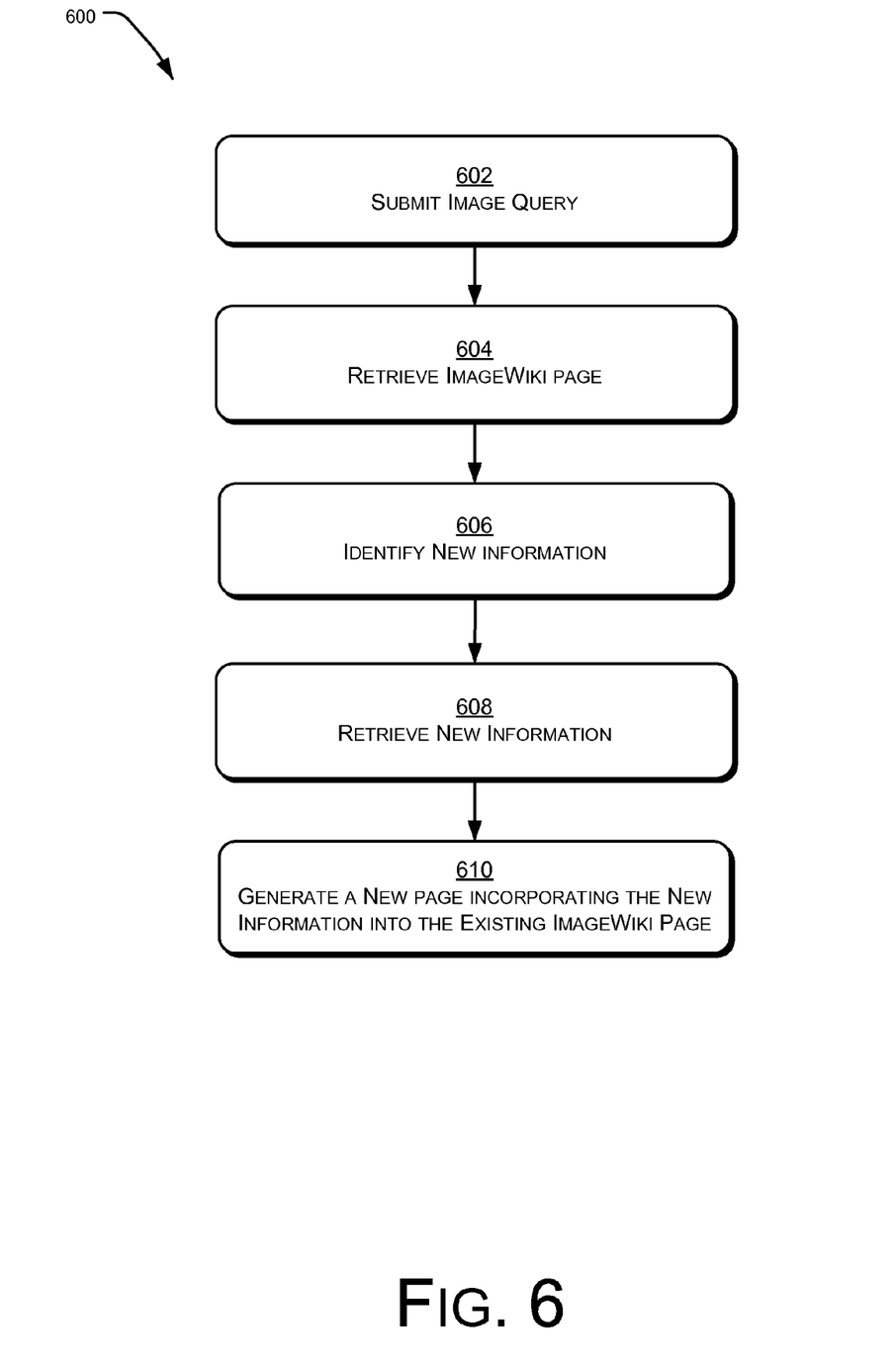
FIG. 6 is a flow diagram of an illustrative process for implementing a user generated ImageWiki architecture by modifying an existing ImageWiki page.

FIG. 6. is a flow diagram of an illustrative process 600 for implementing a user-implemented ImageWiki architecture. In operation 602, the user submits an image query.

In operation 604, an existing ImageWiki page is retrieved in response to the query. The user identifies new information in operation 606. The user may identify the new information by visual inspection of the existing ImageWiki page and the user's knowledge of the subject matter. The user may also use other applications to determine missing information, incorrect information, misleading information or any other information that may need updating in the existing ImageWiki page.

The new information is retrieved in operation 608 from the server at the request of the user. In operation 610 a new page is generated that incorporates the new information into the existing ImageWiki page. In other instances, a new page may be generated and the original page as modified also continues to exist. Both the original page and the modification logs that provide a history of the modifications are saved for each of the user's revisions.

Figure 7:
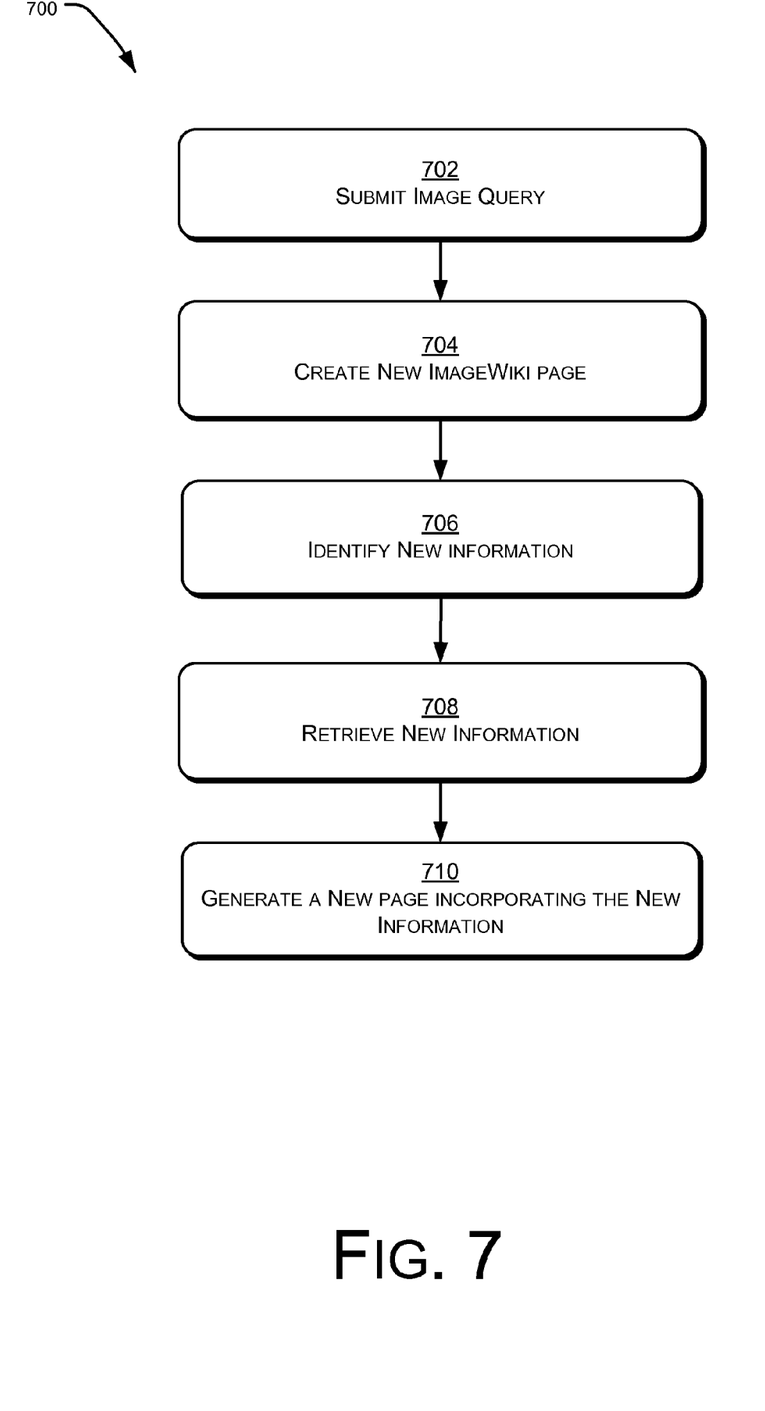
FIG. 7 is a flow diagram of an illustrative process for implementing a user generated ImageWiki architecture by creating a new ImageWiki page.

FIG. 7. is a flow diagram of an illustrative process 700 for implementing a user-implemented ImageWiki architecture. In operation 702, the user submits an image query.

In operation 704, an existing ImageWiki page does not exist and a new ImageWiki page is created. The query is used to locate related images and identify new information in operation 706. The user may identify the new information by visual inspection and the user's knowledge of the subject matter. The user may also use other applications to determine missing information, incorrect information, misleading information or any other information that may need updating in the existing ImageWiki page.

The new information is retrieved in operation 708 from the server at the request of the user. In operation 710 a new page is generated that incorporates the new information into the new ImageWiki page.

Although the subject matter herein has been described in language specific to structural features and/or methodological operations, it is to be understood that the subject matter defined in the appended claims is not necessarily limited to the specific features or operations described above. Rather, the specific features and acts described above are disclosed as example forms of implementing the claims.

The invention claimed is:

1. A method comprising:
retrieving a plurality of images in response to a query;
receiving selection of an image from the plurality of images based at least in part on a ranking of the plurality of images in order of relevance to the query;
retrieving a plurality of textual information automatically from a plurality of web data related to the image, the textual information including at least one of text, metadata, or tags;
ranking the plurality of textual information based on relevance to the image;
extracting a subset of the plurality of textual information that is less than a whole of the plurality of textual information to create a plurality of selected information, wherein the extracting comprises selecting a first textual information of the plurality of textual information and not selecting a second textual information of the plurality of textual information, the selecting and not selecting being based at least on the ranking of individual textual information of the plurality of textual information;
and
generating a new web page containing the image and the extracted subset of the plurality of textual information automatically retrieved from the plurality of web data related to the image.

2. The method of claim 1, wherein the plurality of textual information comprises at least one of: (i) an author, a title, a date, and a source of the image, or (ii) a textual story describing the image.

3. The method of claim 1, wherein the new web page comprises a plurality of different images that are related to the image.

4. The method of claim 1, wherein the new web page comprises a plurality of links to videos that are related to the image.

5. The method of claim 1, wherein the plurality of textual information further comprises a plurality of news events related to the image.

6. The method of claim 1, wherein the plurality of textual information comprises a plurality of links to a plurality of web pages that are related to the image.

7. The method of claim 1, wherein the new web page comprises a caption which provides additional background information on a subject of the image.

8. The method of claim 1, wherein the plurality of images is indexed to discover duplicates from the plurality of images to enable selection of an optimal image.

9. The method of claim 1, wherein the extracting the subset of the plurality of textual information from the plurality of web data uses a majority voting technique.

10. The method of claim 1, further comprising conducting a cross media recommendation analysis.

11. The method of claim 10, wherein the cross media recommendation analysis uses a textual representation of a video based at least in part on text associated with the video to provide the cross media recommendation for the image.

12. The method of claim 1, wherein the query is an image-based query that is submitted by selecting a region in an image that is a subject of the query.

13. The method of claim 1, wherein the plurality of web data comprises: a plurality of image data, a plurality of web pages, a plurality of social tagging sites and a plurality of query logs.

14. The method of claim 1, wherein the new web page is generated automatically by a computer.

15. The method of claim 1, wherein the generating the new web page includes arranging the individual information of the plurality of selected information on the new web page in an order different from a source of the plurality of selected information.

16. A system comprising:
a memory;
one or more processors operatively coupled to the memory and disposed within one or more devices;
an application stored in the memory and executed by the one or more processors to access a plurality of web pages, wherein the application comprises:
a web image mining component to:
- access web data from a plurality of sources based on a query;
- rank a plurality of images from the web data in order of relevance to the query;
- select an image from the plurality of images based at least in part on the ranking; and
- aggregate a plurality of information from the web data to create a plurality of selected information that is related to the image and collected from at least a plurality of sources separate from a source that provided the image, wherein the aggregating comprises not selecting a subset of information collected from one of the plurality of sources separate from the source that provided the image; and a page generation component to generate a new web page containing the image and the aggregated plurality of selected information.

17. The system of claim 16, wherein the web image mining component is further configured to conduct a cross media recommendation analysis that uses a textual representation of a video based at least in part on a plurality of tags surrounding the video to provide a recommendation for selection of a plurality of additional information to optimize the new web page to further optimize the aggregated plurality of selected information.

18. The system of claim 16, wherein the web data comprises at least one of: a plurality of image data, a plurality of web pages, a plurality of social tagging sites and a plurality of query logs.

19. One or more computer storage media storing instructions that, when executed by one or more processors, cause the one or more processors to perform operations comprising:
- retrieving a plurality of images in response to a query;
- ranking the plurality of images in an order based on relevance to the query;
- selecting an image from the plurality of images based at least in part on the ranking;
- retrieving a plurality of information from a plurality of data related to the image;
- aggregating the plurality of information, wherein the aggregating comprises extracting a subset of the plurality of information based at least in part on relevance of the subset of the plurality of information to the image to create a plurality of selected information, wherein the relevance of the subset of the plurality of information to the image is determined at least in part by a ranking of a plurality of subsets of the plurality of information;
and
- generating an electronic page comprising the image and the aggregated plurality of selected information retrieved automatically from the plurality of data, wherein the generating includes arranging individual information of the plurality of selected information in an order different from a source of the plurality of selected information.

20. The one or more computer storage media of claim 19, wherein the operations further comprise conducting a cross media recommendation analysis to further optimize the quality of the aggregated plurality of selected information, wherein the cross media recommendation provides a recommendation for selection of a plurality of additional information.

* * * * *